3,814,595
GRANULATION OF LANGBEINITE
Albert F. Boeglin and Edward A. Chowning, Carlsbad, N. Mex., assignors to International Minerals & Chemical Corporation
No Drawing. Filed Mar. 1, 1973, Ser. No. 337,089
Int. Cl. C05d 11/00
U.S. Cl. 71—61                                   5 Claims

ABSTRACT OF THE DISCLOSURE

Fine langbeinite particles are granulated by first preparing a langbeinite material sized such as it is not more than 10% +35 mesh, 15% to 35% −200 mesh, with the remainder being −35 +200 mesh. The sized langbeinite is wetted to a moisture content of 6.5 to 11.5% by weight of the langbeinite. The resulting mass is granulated, cured for at least two hours, and dried to a moisture content of 2% to 5%. Product temperature is maintained below a maximum of 300° F. and the maximum temperature of gases contacting the product is maintained below 1200° F.

BACKGROUND OF THE INVENTION

It is frequently desirable that fertilizer ingredients be provided in granular form rather than as finely divided particulate solids. Finely divided solids tend to dust during handling and may tend to clog application equipment that frequently is designed to handle only granular material.

Granulation of fertilizer components is known to the art and is disclosed, inter alia, in U.S. Pats. Nos. 2,107,701, 2,107,702 and 3,440,033. Finely divided solids are tumbled in a disc or drum-type granulator in the presence of a binder which often includes water or an aqueous solution or suspension of a substance that acts as an adhesive to coalesce the particulate solids into granules. Following the tumbling operation the granules may be dried, if desired.

Inasmuch as fertilizer components are bulk materials, stringent economic standards restrict severely the choice of binders. Moreover, in order to maintain product grade it is desirable that the granule contains only a minimum of foreign binder. Finally, the granule must properly release the fertilizer values when applied to the ground. Economic and product grade and performance considerations so severaly limit the field of choice that the economic manufacture of stable granules continues to present a meaningful technical challenge. The binder must not be an unacceptable contaminant, and desirably it adds no ions not already present.

It has been found, quite apart from the problem of product purity degradation by binder addition, that langbeinite fines do not granulate readily, but tend to form granules which are outside of the desired size ranges and which are also lacking in sufficient green strength to permit drying of the particles without excessive breakdown. Accordingly, the langbeinite starting material must be carefully sized (throughout this specification Tyler mesh is employed) and the green granules must be cured.

In accordance with this invention it has been determined that granular langbeinite of desired size ranges and with outstanding resistance to granule degradation can be produced by a method which comprises establishing a mass of langbeinite particles characterized by a crystal size distribution which is not more than about 10% by weight −35 mesh, about 15% to about 35% by weight −200 mesh, with the remainder being −35 +200 mesh, and a water content in the range of about 6.5% to about 11.5% by weight of the langbeinite, rolling the mass in a confined rolling bed on a substantially smooth moving surface to form granules, curing the granules without substantial drying for at least about two hours, and drying the granules to a water content of about 2 to about 5% by weight of the langbeinite by heat exchange with hot combustion gases, the maximum temperature of gases in contact with said granules being maintained at less than 1200° F., and the maximum temperature of said granules during drying being maintained at less than about 300° F.

In the practice of this invention the granulation step may be carried out in conventional granulating equipment, such as a drum granulator. The drying step may be carried out in a conventional counter-current rotary drier. The mixing of langbeinite with water may be done in a pug mill. The drier may be conventional; but it is preferred that there be no flights or lifters in the initial few feet of the vessel where the langbeinite granules are introduced. Thereafter conventional flights or lifters may be employed as desired.

The langbeinite should be sized if necessary to provide a feed batch which is not more than about 10% by weight +35 mesh and about 15% to about 35% by weight −200 mesh. Feeds not meeting these size standards have been found to granulate poorly. A feed batch which is less than about 5% +35 mesh and about 18% to about 28% −200 mesh is definitely preferred for the practice of this invention.

The moisture (water) content of the langbeinite mass will be in the range of 6½ to 11½%, and more preferably in the range of 9½% to 10½%, based on the weight of the langbeinite. This moisture content is obtained by the simple addition of water, followed by thorough mixing to evenly wet the particles. This may be accomplished by mixing in a pug mill.

It is essential to the practice of the instant invention that the temperature of gases contacting the potassium sulfate granules in the drying step be at a temperature below about 1200° F. Higher temperatures result in a product which degrades excessively, i.e., a selected fraction, say the 8 x 10 mesh fraction, displays a physical degradation in the amount of substantially more than about 15% in a degradation test. Moreover, it is important that the granules during the drying operation do not reach a maximum temperature in excess of 300° F. Violation of these temperature criteria results in the production of lesser quantities of granules within the desired size ranges, and those granules that are formed possess inadequate degradation resistance. It is distinctly preferred that the product be dried at a temperature in the range of about 200° F. to 300° F. and for a time of not more than about 30 minutes.

The residual moisture content of the dried, granular product must be at least 2% by weight, should be less than 5% by weight, and preferably will be in the range of 2½ to 4% by weight. Too little residual moisture results in granules of insufficient strength.

As described, it is essential to the practice of this invention that the granules be cured for a period of at least two hours, and more preferably for a period of 3 to 5 hours, between discharge of the granules from the granulator and the drying of the granules at elevated temperatures in the drier. The green granules should be handled with care during the curing stage because they have little physical strength. Curing can be at ambient or at slightly elevated temperatures.

While the green granules can be stored in a number of different ways during the curing step, a convenient method is to place the granulator discharge directly onto a slowly moving conveyor belt. The speed and length of the conveyor belt may be adjusted to provide a residence time of 2 hours between discharge from the granulator and introduction into the drier. Desirably, the belt will be divided into at least two sections. The first section may provide a residence time of about 45 min., with the second section providing the balance of the two-hour period.

Between the two belts there will desirably be a vertical product drop of about 1 ft. This expedient tends to prevent caking of the green granules which may otherwise occur if the granules are substantially undisturbed for a two-hour period. Such caking is, in any event, not severe and to the extent it occurs the cake is broken before introduction into the drier. After a curing period of two hours the granules can be handled conventionally. They may be further cured in conventional storage vessels if desired. They will stand a vertical drop of about 10 ft. to a hard surface without substantial degradation.

The tests reported in the following examples were carried out by mixing langbeinite fines with water in a pug mixer, tumbling the moistened langbeinite mass in a drum granulator, aging or curing the granulator discharge for varying periods of time as stated, and drying the granules in a rotary, cylindrical gas-fired drier. The drier discharge was sampled and the moisture content and size distribution of the samples determined.

The degradation tests reported in the examples were carried out by first preparing a size fraction to be tested by hand screening through Tyler sieves until only minor amounts passed through the sieve. Then 500 grams of the selected fraction, such as 8 x 10 mesh, were placed in a laboratory tumbler with two steel rods ½ in. in diameter and 6 in. long. The rods and sample were tumbled for 5 min. The material was then screened and the percent degradation determined by weighing the amount of tumbled product which passed through the original smaller sieve, i.e., the 10 mesh sieve.

EXAMPLE I

Forty-six tests, some in accordance with the instant invention and some under conditions outside the scope of the instant invention, were carried out. The product was dried in a counter-current rotary drier. The curing time, the maximum temperature that the product reached during drying, the percent degradation of the product in a degradation test, and the percent residual moisture of the product are reported.

TABLE I

| Test number | Curing time (hrs.) | Drying product temp., °F. | 8 x 10 mesh degradation test, percent degradation | Percent residual H₂O |
|---|---|---|---|---|
| 1 | 2 | 198 | 16.7 | 3.6 |
| 2 | 3 | 235 | 11.2 | 3.45 |
| 3 | 4¼ | 175 | 7.1 | 5.4 |
| 4 | 23½ | 552 | 25.4 | 0.25 |
| 5 | 25 | 268 | 10.2 | 2.35 |
| 6 | 28 | 425 | 21.6 | 0.5 |
| 7 | 48 | 354 | 18.7 | 0.9 |
| 8 | 0 | 365 | 94.6 | 0.35 |
| 9 | 2 | 266 | 16.0 | 2.6 |
| 10 | 3 | 263 | 14.2 | 2.7 |
| 11 | 4 | 275 | 12.8 | 2.7 |
| 12 | 24 | 294 | 12.4 | 1.9 |
| 13 | 25 | 243 | 8.0 | 3.4 |
| 14 | 25 | 258 | 7.0 | 3.35 |
| 15 | ½ | 279 | 27.8 | 1.53 |
| 56 | 1 | 333 | 26.5 | 1.47 |
| 17 | 1½ | 266 | 17.5 | 1.75 |
| 18 | 2 | 244 | 12.0 | 3.10 |
| 19 | 2 | 189 | 16.1 | 3.9 |
| 20 | 2 | 170 | 12.2 | 3.7 |
| 25 | 2 | 174 | 14.0 | 4.2 |
| 22 | ¹8 | 230 | 19.6 | 2.6 |
| 23 | 2 | 220 | 37.3 | 0.64 |
| 24 | 2½ | 225 | 33.0 | 1.5 |
| 25 | 22 | 225 | 15.9 | 2.7 |
| 26 | 2 | 220 | 29.4 | 2.35 |
| 27 | 2½ | 222 | 17.8 | 2.85 |
| 28 | 3 | 218 | 11.8 | 3.45 |
| 29 | 3½ | 228 | 13.6 | 2.9 |
| 30 | ½ | 224 | 75.8 | 1.1 |
| 31 | 1 | 234 | 44.1 | 2.3 |
| 32 | 1½ | 230 | 29.6 | 1.85 |
| 33 | 2 | 218 | 18.4 | 2.65 |
| 34 | 2½ | 236 | 23.1 | 2.35 |
| 35 | 3 | 236 | 24.0 | 2.25 |
| 36 | 3½ | 230 | 20.4 | 2.35 |
| 37 | 4 | 228 | 20.9 | 2.50 |
| 38 | 4½ | 220 | 17.0 | 2.45 |
| 39 | ½ | 214 | 58.6 | 1.6 |
| 40 | 1 | 202 | 45.6 | 1.3 |
| 41 | 1½ | 206 | 42.2 | 1.3 |
| 42 | 2 | 191 | 34.4 | 1.55 |
| 43 | 2½ | 181 | 32.6 | 1.25 |
| 44 | 3 | 180 | 33.8 | 1.60 |
| 45 | 3½ | 178 | 30.1 | 1.55 |
| 46 | 4 | 182 | 29.3 | 1.60 |

¹ Days.

EXAMPLE II

This example was conducted similarly to Example I with the exception that the drier was operated counter-current.

TABLE II

| Test number | Curing time (hrs.) | Drying product temp., °F. | 8 x 10 mesh degradation test, percent degradation | Percent residual H₂O |
|---|---|---|---|---|
| 1 | ½ | 204 | 29.6 | 2.15 |
| 2 | 1 | 204 | 25.0 | 2.45 |
| 3 | 1½ | 206 | 23.2 | 2.3 |
| 4 | 2 | 207 | 16.1 | 2.55 |
| 5 | 2½ | 210 | 15.3 | 2.75 |
| 6 | 3 | 198 | 14.4 | 2.90 |
| 7 | 3½ | 202 | 12.4 | 3.00 |
| 8 | 4 | 204 | 12.2 | 3.00 |
| 9 | 2 | 214 | 16.1 | 2.85 |
| 10 | 2½ | 196 | 14.7 | 2.90 |
| 11 | 3 | 190 | 12.2 | 3.50 |
| 12 | 4 | 196 | 10.1 | 3.30 |

The criticality of curing time, maximum product temperature in the drying step, and the percent residual moisture upon the physical characteristics of the product as measured by the degradation tests is established in the foregoing examples.

What is claimed is:

1. A method of granulating langbeinite comprising establishing a mass of langbeinite particles characterized by a size distribution of not more than about 10% by weight +35 mesh, about 15 to about 35% by weight —200 mesh, with the remainder being —35 +200 mesh; and water in the amount of about 6.5 to about 11.5% by weight of the langbeinite; rolling said mass in a confined bed on a substantially smooth moving surface to form granules, curing said granules without substantial drying for at least 2 hours, and then drying said granules to a water content of about 2% to about 5% by weight by heat exchange between said granules and hot combustion gases, the maximum temperature of gases in contact with said granules being maintained at less than about 1200° F., and the maximum temperature reached by said granules in the drying step being maintained below about 300° F.

2. The method in accordance with claim 1 in which said size distribution is less than about 5% +35 mesh and about 18 to about 28% —200 mesh.

3. The method in accordance with claim 2 in which said mass contains water in the amount of about 9.5% to about 10.5% by weight.

4. The method in accordance with claim 3 in which said granules are dried to a moisture content of about 2½ to about 4%.

5. The method in accordance with claim 4 in which said granules are dried at a product temperature of about 200° F. to about 300° F. for a time of not more than 30 minutes.

References Cited

UNITED STATES PATENTS

| 3,630,713 | 12/1971 | Adams | 71—63 X |
| 2,218,551 | 10/1940 | Richards | 423—554 |
| 3,617,243 | 11/1971 | Neitzel | 71—63 |
| 3,620,709 | 11/1971 | Petkovsek | 71—64 DA X |

CHARLES N. HART, Primary Examiner

R. BARNES, Assistant Examiner

U.S. Cl. X.R.

23—313; 71—63, 64 DA; 264—117; 423—551, 554